US010762717B2

(12) United States Patent
Alkouh

(10) Patent No.: US 10,762,717 B2
(45) Date of Patent: Sep. 1, 2020

(54) BLEND SHAPE SYSTEM WITH DYNAMIC PARTITIONING

(71) Applicant: SONY INTERACTIVE ENTERTAINMENT AMERICA, LLC, San Mateo, CA (US)

(72) Inventor: Homoud B. Alkouh, San Diego, CA (US)

(73) Assignee: SONY INTERACTIVE ENTERTAINMENT AMERICA, LLC, San Mateo, CA (US)

(*) Notice: Subject to any disclaimer, the term of this patent is extended or adjusted under 35 U.S.C. 154(b) by 0 days.

(21) Appl. No.: 15/280,874

(22) Filed: Sep. 29, 2016

(65) Prior Publication Data

US 2018/0089906 A1     Mar. 29, 2018

(51) Int. Cl.
*G06T 19/20*     (2011.01)
*G06T 17/00*     (2006.01)

(52) U.S. Cl.
CPC .............. *G06T 19/20* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 6,448,971 B1 | 9/2002 | Seefeldt et al. | |
| 6,850,243 B1 | 2/2005 | Kilgariff et al. | |
| 6,906,732 B1 | 6/2005 | Li et al. | |
| 6,919,904 B1 | 7/2005 | Kilgariff | |
| 7,542,036 B2 | 6/2009 | Museth et al. | |
| 2005/0219250 A1 | 10/2005 | Sepulveda | |
| 2007/0019882 A1* | 1/2007 | Tanaka | G06T 17/20 382/276 |
| 2009/0213138 A1 | 8/2009 | DeRose et al. | |
| 2013/0314412 A1* | 11/2013 | Gravois | G06T 19/00 345/420 |
| 2014/0049535 A1* | 2/2014 | Wang | G01B 11/2509 345/419 |
| 2014/0267306 A1* | 9/2014 | Koniaris | G06T 15/04 345/473 |
| 2016/0027200 A1* | 1/2016 | Corazza | G06K 9/00362 345/420 |
| 2016/0035142 A1* | 2/2016 | Nair | G06T 17/205 345/420 |
| 2016/0042548 A1 | 2/2016 | Du et al. | |
| 2016/0247308 A1 | 8/2016 | Jiao et al. | |
| 2016/0247309 A1 | 8/2016 | Li et al. | |

* cited by examiner

*Primary Examiner* — Hilina K Demeter

(74) *Attorney, Agent, or Firm* — Seed IP Law Group LLP

(57) ABSTRACT

A method and system that dynamically partitions a 3-D model into multiple regions. The method determines the vertices to be included in each region according to values assigned to an appropriate color channel for each vertex. After partitioning the 3-D model into different regions, the method allows a user to assign different weights to each region to specify a contribution by a driving shape for deforming that region. Dynamic partitioning may be used on multiple color channels to partition the three dimensional model into more than two regions.

33 Claims, 11 Drawing Sheets

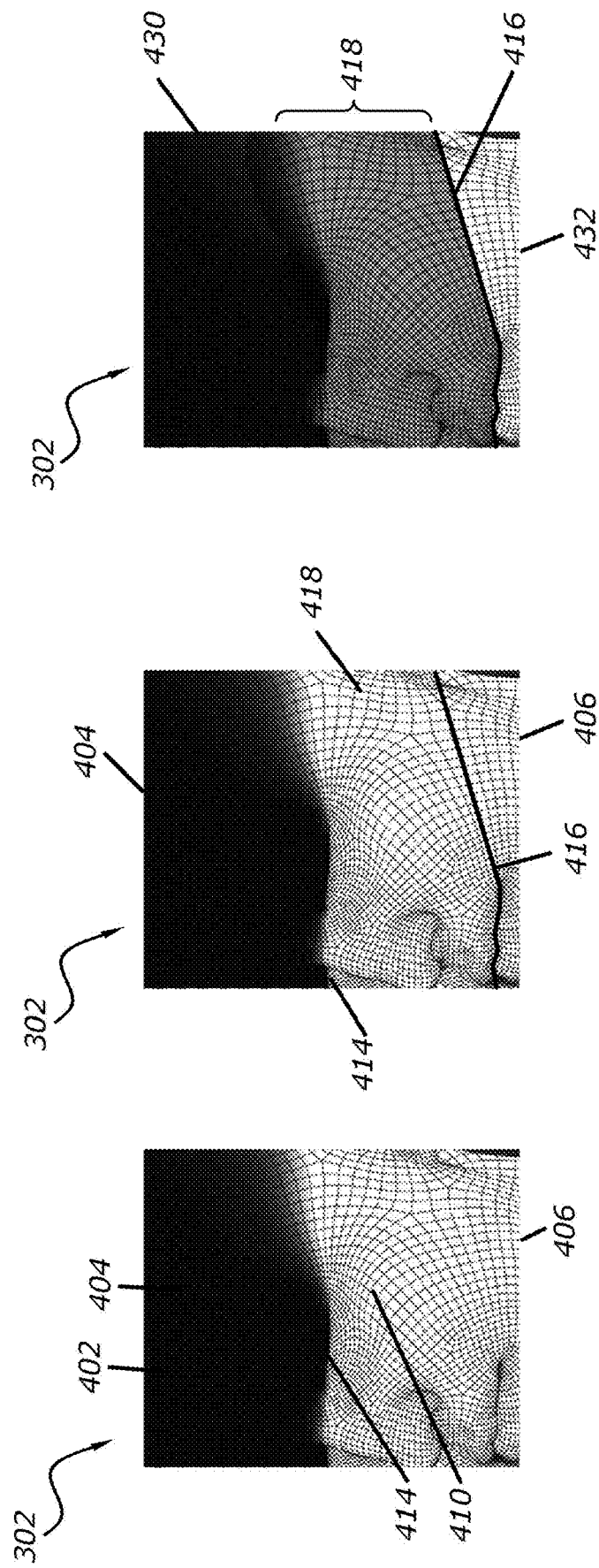

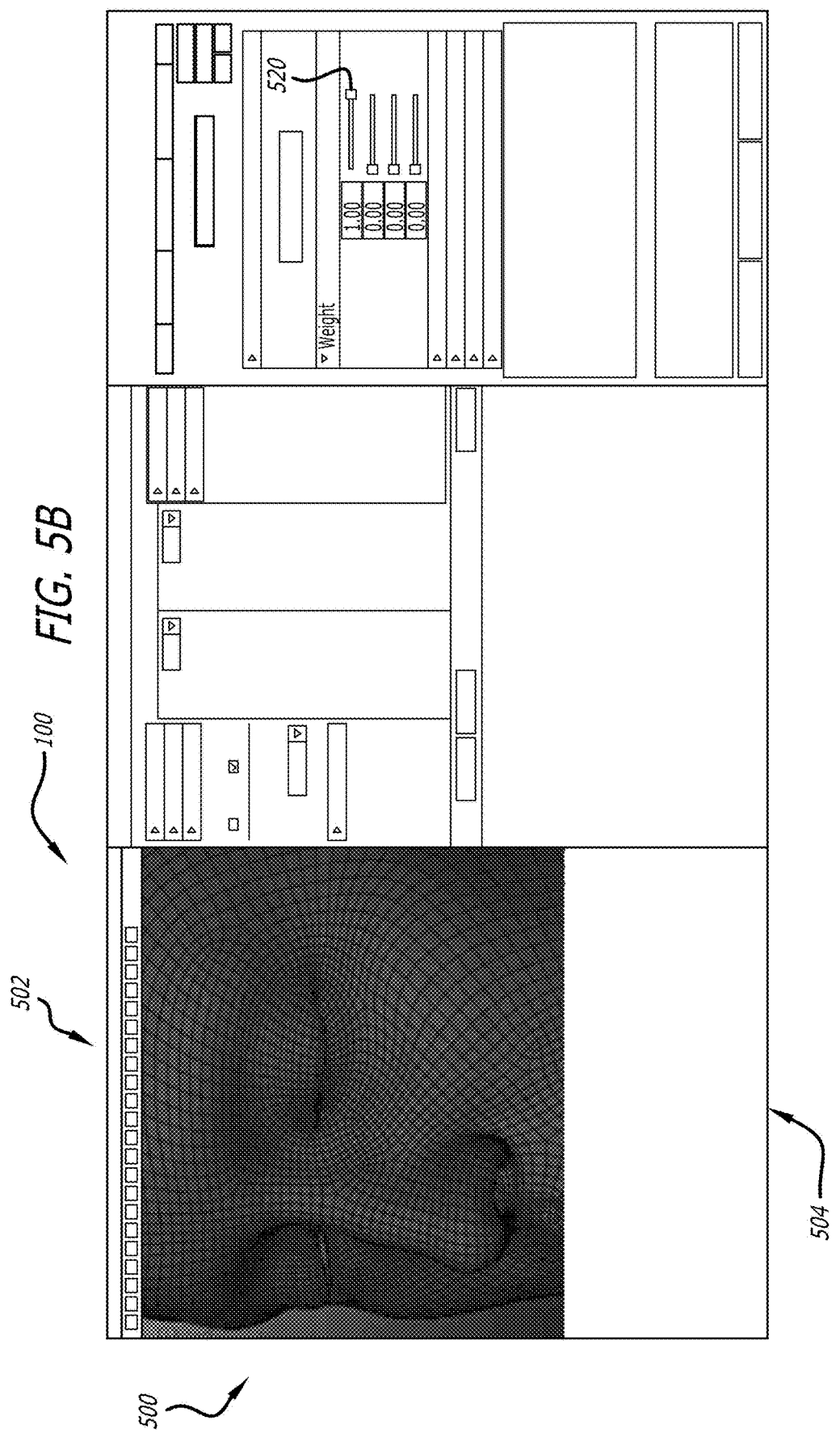

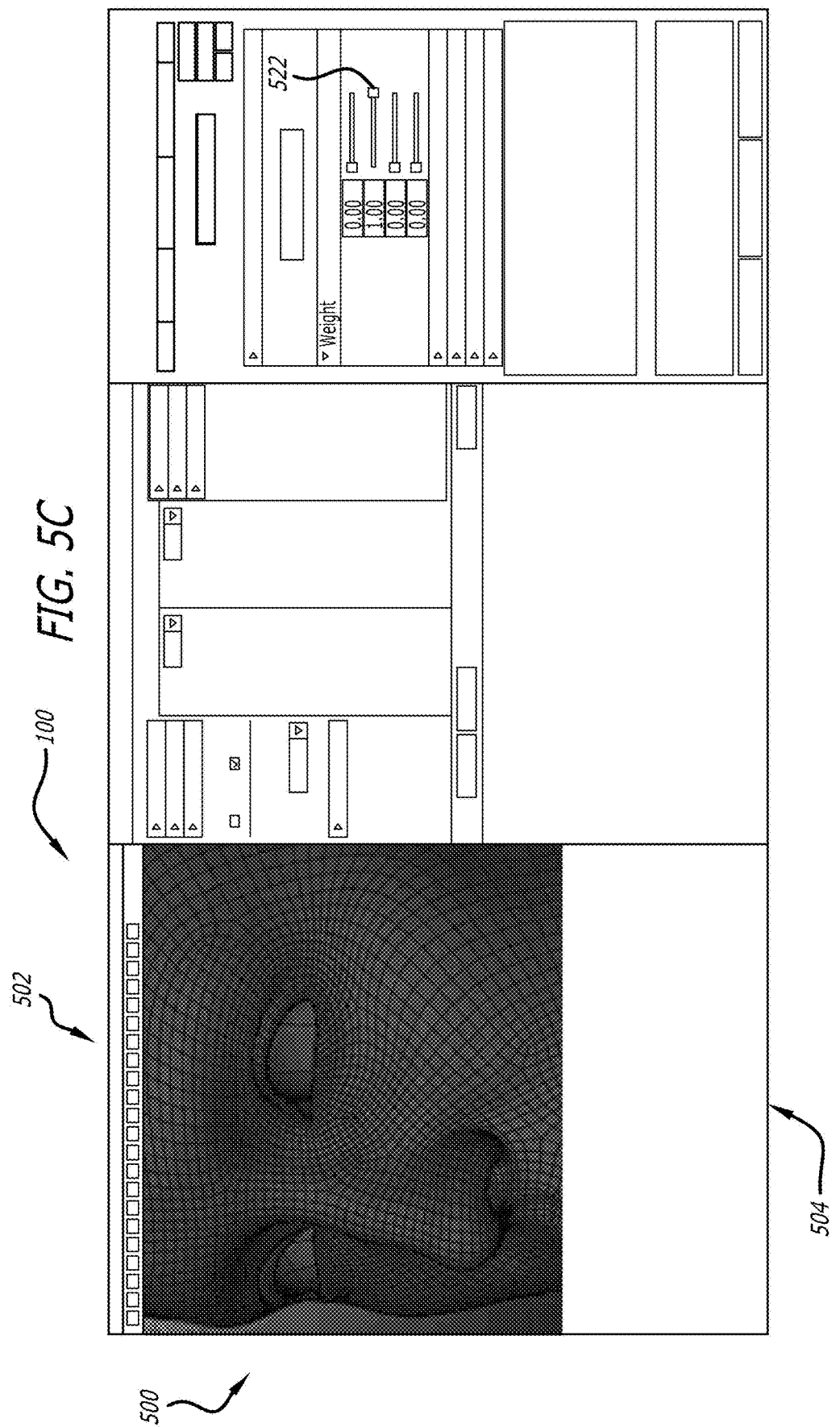

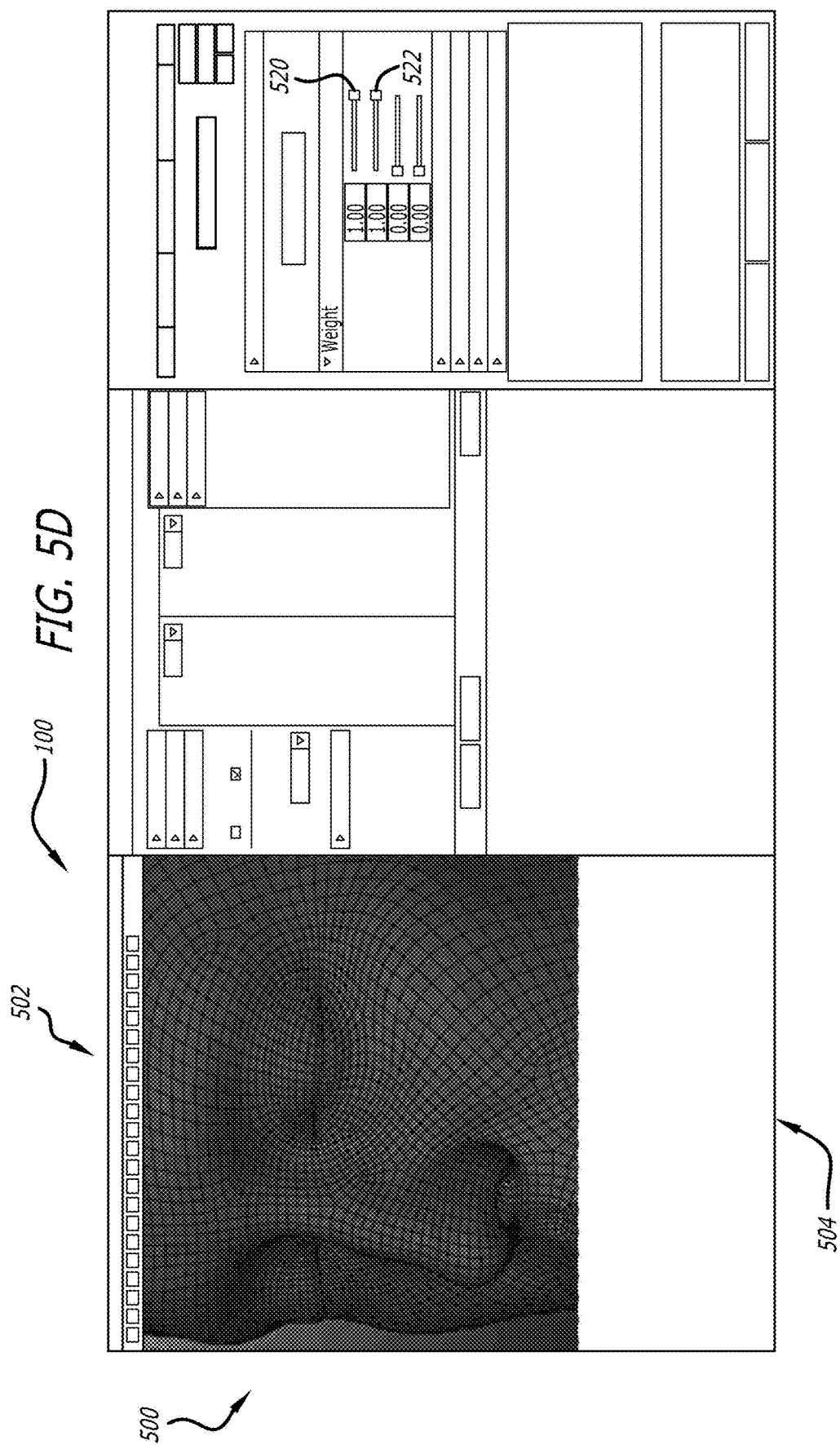

BLEND SHAPE SYSTEM WITH DYNAMIC PARTITIONING

BACKGROUND

Technical Field

The present disclosure generally relates to providing improved graphics rendering in three-dimensional and virtual reality spaces. More particularly, but not exclusively, the present disclosure relates to improved control for morph target animation.

Description of the Related Art

Designers generally model a three-dimensional object by partitioning the object into multiple polygons, such as triangles, with the vertices of each of these polygons being assigned a value for a position or location in space. Blend shape combination systems allow designers to move and manipulate these three dimensional objects by deforming a neutral base shape into one or more target shapes, which may also be referred to as driving shapes. For example, the neutral base shape may be a face with a neutral expression, and the target or driving shapes may be the same face with different expressions, such as angry, happy, sad, or the like. The blend shape combination system may create the different driving shapes by moving the vertices of the polygons that are used to create the three-dimensional model. During this process, the vertices may move relative to one another and in absolute space, resulting in the vertices occupying a different position, for example, in the X-Y-Z space. Designers may create a desired modified expression by assigning weights to the various driving shapes, with the weights determining how much of each driving shape contributes to the desired expression. During animation, a three-dimensional model may change, or morph, between different desired expressions by changing the respective weights assigned to the various driving shapes. This process may result in changing the positions of the vertices relative to one another, resulting in polygons of different sizes.

In some situations, a computer graphics artist ("CG artist") may want to have more control when deforming a three-dimensional model into a blend shape. Accordingly, in some situations, the CG artist may desire the capability of applying different degrees of deformation from a driving shape to different parts of the 3-D model. Such a capability would enable the CG artist to depict a wider range of expressions with the same number of driving shapes. For example, the CG artist may have a driving shape that depicts a 3-D model of a person's head closing its eyes. In prior art systems, this deformation may involve a base shape that depicts the head in a neutral state and a driving shape that depicts the head with the eyes completely closed. The driving shape may involve changing the polygons and the positions of the vertices associated with those polygons, e.g., those polygons surrounding the eyes. This may include those polygons both immediately above the eyes (e.g., the upper eyelid and eyebrows) and immediately below the eyes (e.g., the lower eyelid). With only one driving shape, however, prior art systems essentially force a CG artist into a predefined or set relationship to change the polygons and vertices surrounding the eyes.

FIG. 1A shows a base shape 102 of a 3-D model of a portion of the person's head as depicted in a prior art system. FIG. 1B shows a driving shape 152 in the same prior art system in which the eyes of the 3-D model have been closed.

As shown in FIG. 1A, the base shape 102 is partitioned into a set of non-overlapping polygons 104 (one identified in FIG. 1A) that forms a polygon mesh. The polygons are defined by associated vertices 106 (one identified in FIG. 1A). As shown in FIG. 1B, the driving shape 152 is also partitioned into a set of polygons 104 and associated vertices 106. The polygons 104 and vertices 106 in the driving shape correspond to polygons 104 and vertices 106 in the base shape 102. The prior art system renders the driving shape 152 by deforming the areas of the base shape 102 corresponding to upper eyelids 154 and 156, an eyebrow 158, and lower eyelids 160 and 162. The prior art system accomplishes the deformation by moving the positions, or X-Y-Z locations, of the vertices 106 used to form the 3-D model. The prior art system may further store the positional information for the vertices 106 in the driving shape 152 in terms of their positional delta, or change in location in the X-Y-Z space when compared to the positions of the corresponding vertices 106 in the base shape 102.

Accordingly, in the prior art system, the driving shape 152 essentially forces the CG artist into the positional changes defined for all of the vertices 106 used to form the driving shape 152. Thus, for example, if a CG artist sets the driving shape 152 to contribute 50% to the deformation of base shape 102 to form a final blend shape, then all of the vertices 106 used to form the final blend shape, including those used to form the upper eyelids 154 and 156, the eyebrow 158, and the lower eyelids 160 and 162, will move to positions corresponding to 50% of their positional deltas between their base shape 102 locations and their driving shape 152 locations. A CG artist thus has a limited amount of control over the facial expressions that can be depicted on the final blend shape model. As such, the CG artist cannot set different levels of contributions from different regions of the driving shape 152. For example, the vertices forming the upper eyelids 154 and 156 and eyebrow 158 contribute 50% of their delta values, but the vertices forming the lower eyelids 160 and 162 contribute only 10% of their delta values.

Some prior art systems have attempted to provide CG artists with a greater degree of control over different regions of 3-D models. Some prior art systems, for example, enable a CG artist to partition a 3-D model into multiple regions, but the process of partitioning an asymmetrical shape into different regions and providing different controls over each region is difficult, labor intensive, and error-prone. In the prior art, a shape can be partitioned into multiple regions by duplicating the shape for each region and removing all positional changes that do not apply to the duplicated region. This technique effectively "bakes" the deformation (or lack thereof) from a specified region of the base shape into the driving shape. This prior art technique, however, not only is time consuming, but, again, is prone to errors. More particularly, this baking technique requires a CG artist to manually specify the regions in which the changes do not apply, which can result in the CG artist mistakenly over- or under-specifying the parts of the 3-D model that are to remain constant and not be changed. In addition, this baking technique can result in a clear segmentation between regions in which the changes apply and do not apply. This can result in unrealistic depictions of the 3-D model. Further, this technique can mistakenly result in multiple transformations occurring in a region as the CG artist develops and uses multiple driving shapes. As such, this duplication and baking technique for partitioning a source shape into a driving shape is a non-dynamic and destructive mechanism that limits artistic iterations.

BRIEF SUMMARY

Briefly, and in general terms, there is disclosed systems and methods that provide improved graphics rendering in three-dimensional and virtual reality spaces. More particularly, but not exclusively, the present disclosure relates to improved control for morph target animation. Still further, the disclosed system and methods may be used to partition any type of shape, including asymmetrical shapes, into multiple regions. For example, in one implementation, this technology enables a CG artist to partition any geometric shape into multiple regions using the vertex color to assign each vertex to either a top region or a bottom region. Likewise, in another implementation, the vertex color value may be used to assign each vertex to either a left region or a right region of a blend shape model. Generally, the blend shape may be partitioned into different regions along any axis.

Continuing, a method for dynamically modifying a 3-D model, the model having a plurality of vertices may be summarized as including: obtaining a color channel value for each vertex in the 3-D model; partitioning the vertices in the 3-D model between a first set of vertices that defines a first region of the 3-D model and a second set of vertices that defines a second region of the 3-D model, wherein the partitioning occurs based on the color channel value for each vertex; receiving a first weight contribution value associated with a driving shape; and deforming the vertices in the first region according to the first weight contribution value.

The method may further include: receiving a second weight contribution value associated with the driving shape; and deforming the vertices in the second region according to the second weight contribution value. The method may yet further include: identifying a plurality of vertices to form a third set of vertices that defines a third region of the 3-D model, the plurality of vertices for the third region including at least one vertex from the first set of vertices and at least one vertex from the second set of vertices, the third region being located between the first region and the second region; and deforming the vertices in the third region according to the first weight contribution value and the second weight contribution value. Still further the method may include: identifying the plurality of vertices to form the third set of vertices by applying a smoothing filter to the color channel values of the vertices in the 3-D model. In this method, the first weight contribution value may not equal the second weight contribution value. The first region of the 3-D model may be adjacent to the second region of the 3-D model to form a boundary separating the first region of the 3-D model and the second region of the 3-D model where the two regions meet on a surface of the 3-D model, and wherein at least part of the boundary between the first region of the 3-D model and the second region of the 3-D model is non-linear. The boundary may follow a contour line on the 3-D model. The method may further include: obtaining a second color channel value for each vertex in the 3-D model; partitioning the vertices in the 3-D model between a third set of vertices that defines a third region of the 3-D model and a fourth set of vertices that defines a fourth region of the 3-D model, wherein the partitioning occurs based on the second color channel value for each vertex; receiving a third weight and a fourth weight associated with a second driving shape; deforming the vertices in the third region according to the third weight; and deforming the vertices in the fourth region according to the fourth weight. Partitioning the vertices in the 3-D model between a first set of vertices that defines a first region of the 3-D model and a second set of vertices that defines a second region of the 3-D model may further include: identifying vertices in the 3-D model to be included in the first set of vertices by multiplying the positional value of each vertex by the color channel value of the same vertex, and assigning all remaining vertices in the 3-D model to be included in the second set of vertices. The color channel value for each vertex may be between zero and one, inclusive. In addition, the color channel value may be selected from the group consisting of a red color channel value, a green color channel value, a blue color channel value, and an alpha channel. Alternatively, the color channel value may be selected from the group consisting of a cyan color channel value, a magenta color channel value, a yellow color channel value, and a black color channel value.

In another embodiment a computer-implemented method automatically determines a 3-D model. The 3-D model has a surface that includes a plurality of vertices and may be summarized as including: obtaining, using one or more computing devices, a color channel value for each vertex in the 3-D model; partitioning, using the one or more computing devices, the vertices in the 3-D model between a first set of vertices that defines a first region of the model and a second set of vertices that defines a second region of the model, wherein the partitioning occurs based on the color channel value for each vertex; receiving, using the one or more computing devices, a first weight contribution value associated with a driving shape; and deforming, using the one or more computing devices, the vertices in the first region according to the first weight contribution value.

The computer-implemented method may further include: receiving, using the one or more computing devices, a second weight contribution value associated with the driving shape; and deforming, using the one or more computing devices, the vertices in the second region of the model according to the second weight contribution value. The computer-implemented method may further include: identifying, using the one or more computing devices, a plurality of vertices to form a third set of vertices that defines a third region of the 3-D model, the plurality of vertices for the third region including at least one vertex from the first set of vertices and at least one vertex from the second set of vertices, the third region of the 3-D model being located between the first region of the 3-D model and the second region of the 3-D model; and deforming, using the one or more computing devices, the vertices in the third region of the model according to the first weight contribution value and second weight contribution value. The computer-implemented method may yet further include: identifying, using the one or more computing devices, the plurality of vertices to form the third set of vertices by applying a smoothing filter to the color channel values of the vertices in the 3-D model. In this method, the first weight contribution value may not equal the second weight contribution value. Continuing, the first region of the 3-D model may be adjacent to the second region of the 3-D model to form a boundary separating the first region of the 3-D model and the second region of the 3-D model where the two regions meet on the surface of the 3-D model, and wherein at least part of the boundary between the first region of the 3-D model and the second region of the 3-D model is non-linear. The boundary may follow a contour line on the 3-D model. The computer-implemented method may further include: obtaining, using the one or more computer devices, a second color channel value for each vertex in the 3-D model; partitioning, using the one or more computing devices, the vertices in the 3-D model between a third set of vertices that defines a third region of the model and a fourth set of vertices that defines a fourth region of the model, wherein the partitioning occurs based on the second color channel value for each vertex; receiving, using the one or more computing devices, a third weight contribution value and a fourth weight contribution value associated with a second driving shape; deforming, using the one or more computing devices, the vertices in the third region of the model according to the third weight contribution value; and deforming, using the one or more computing devices, the vertices in the fourth region of the model according to the fourth weight contribution value. Partitioning the vertices in the 3-D model between a first set of vertices that defines a first region of the model and a second set of vertices that defines a second region of the model may further include: identifying, using the one or more computing devices, the vertices in the 3-D model to be included in the first set of vertices by multiplying the positional value of each vertex by the color channel value of the same vertex, and assigning, using the one or more computing devices, all remaining vertices in the 3-D model to be included in the second set of vertices. The color channel value for each vertex may be either zero or one. Still further, the color channel value may be selected from the group consisting of a red color channel value, a green color channel value, a blue color channel value, and an alpha channel. Alternatively, the color channel value may be selected from the group consisting of a cyan color channel value, a magenta color channel value, a yellow color channel value, and a black color channel value.

In another embodiment, a system to determine a 3-D model, the 3-D model having a surface that includes a plurality of vertices may be summarized as including: a memory device in communication with a processor, the memory device having instructions stored thereon that, in response to execution by the processor, cause the processor to: obtain a color channel value for each vertex in the 3-D model; partition the vertices in the 3-D model between a first set of vertices that defines a first region of the model and a second set of vertices that defines a second region of the model, wherein the partitioning occurs based on the color channel value for each vertex; receive a first weight contribution value associated with a driving shape; and deform the vertices in the first region according to the first weight contribution value.

The instructions stored on the memory device, in response to execution by the processor, may further cause the processor to: receive a second weight contribution value associated with the driving shape; and deform the vertices in the second region of the model according to the second weight contribution value. Still further, the instructions stored on the memory device, in response to execution by the processor, may further cause the processor to: identify a plurality of vertices to form a third set of vertices that defines a third region of the 3-D model, the plurality of vertices for the third region including at least one vertex from the first set of vertices and at least one vertex from the second set of vertices, the third region of the 3-D model being located between the first region of the 3-D model and the second region of the 3-D model; and deform the vertices in the third region of the model according to the first weight contribution value and second weight contribution value. The instructions stored on the memory device, in response to execution by the processor, may yet further cause the processor to: identify the plurality of vertices to form the third set of vertices by applying a smoothing filter to the color channel values of the vertices in the 3-D model. The first weight contribution value may not equal the second weight contribution value. The first region of the 3-D model may be adjacent to the second region of the 3-D model to form a boundary separating the first region of the 3-D model and the second region of the 3-D model where the two regions meet on a surface of the 3-D model, and wherein at least part of the boundary between the first region of the 3-D model and the second region of the 3-D model is non-linear. The boundary may follow a contour line on the 3-D model. The instructions stored on the memory device, in response to execution by the processor, may further cause the processor to: obtain a second color channel value for each vertex in the 3-D model; partition the vertices in the 3-D model between a third set of vertices that defines a third region of the model and a fourth set of vertices that defines a fourth region of the model, wherein the partitioning occurs based on the second color channel value for each vertex; receive a third weight contribution value and a fourth weight contribution value associated with a second driving shape; deform the vertices in the third region of the model according to the third weight contribution value; and deform the vertices in the fourth region of the model according to the fourth weight contribution value. As the processor partitions the vertices in the 3-D model into a first set of vertices to define a first region of the model and a second set of vertices to define a second region of the model, the processor may further: identify the vertices in the 3-D model to be included in the first set of vertices by multiplying the positional value of each vertex by the color channel value of the same vertex, and assign all remaining vertices in the 3-D model to be included in the second set of vertices. The color channel value for each vertex may be between zero and one, inclusive. The color channel value may be selected from the group consisting of a red color channel value, a green color channel value, a blue color channel value, and an alpha channel. Alternatively, the color channel value may be selected from the group consisting of a cyan color channel value, a magenta color channel value, a yellow color channel value, and a black color channel value.

Other features and aspects of the disclosed technology will become apparent from the following detailed description, taken in conjunction with the accompanying drawings, which illustrate by way of example, the features of the various embodiments.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 4A is an illustration of a base shape showing a first division between a top region and a bottom region, according to at least one illustrated embodiment.

FIG. 4B illustrates the base shape from FIG. 4A, but with a line marking a desired division between the top and bottom regions, according to one illustrated embodiment.

FIG. 4C illustrates the base shape from FIG. 4A, but with a modified division between the top region and the bottom region shown, according to at least one illustrated embodiment.

FIG. 5B illustrates the 3-D model of FIG. 5A in the design space system in which only the top region has been deformed according to the driving shape, according to at least one illustrated embodiment.

FIG. 5C illustrates the 3-D model of FIG. 5A in the design space system in which only the bottom region has been deformed according to the driving shape, according to at least on illustrated embodiment.

FIG. 5D illustrates the 3-D model of FIG. 5A in the design space system in which both the top region and the bottom region have been deformed according to the driving shape, according to at least one illustrated embodiment.

DETAILED DESCRIPTION

Figure 1B:
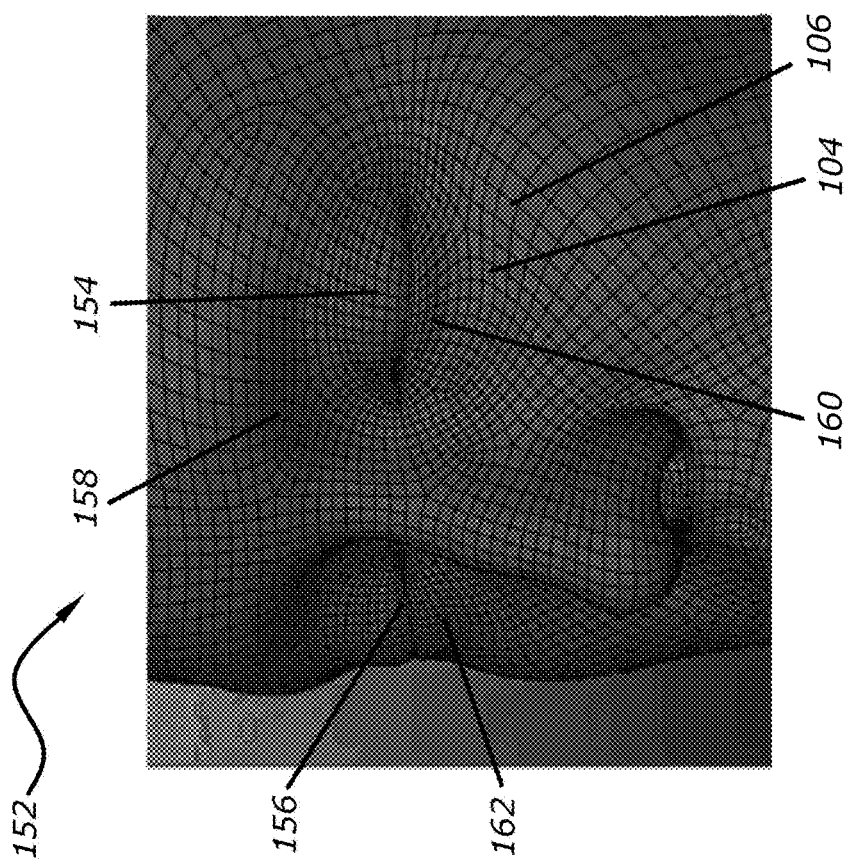
FIG. 1B shows a driving shape as depicted in FIG. 1A in which the eyes of the 3-D model have been closed.
Figure 1A:
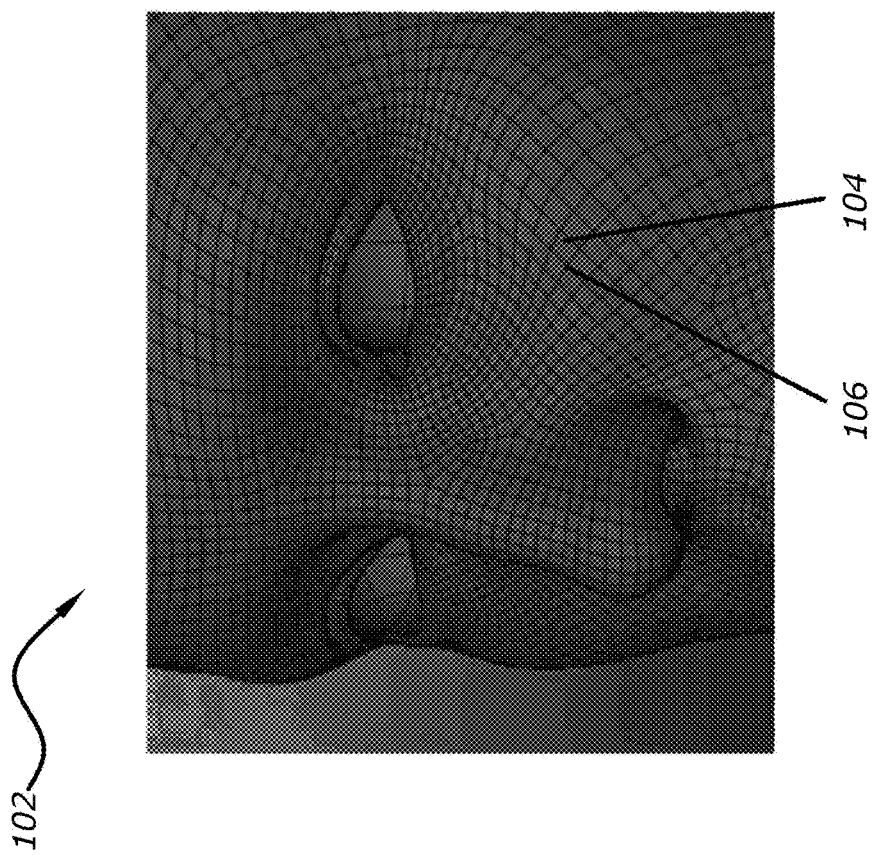
FIG. 1A shows a base shape of a 3-D model of a portion of a person's head with the eyes in an open position, as depicted in a prior art system.

Persons of ordinary skill in the art will understand that the present disclosure is illustrative only and not in any way limiting. Other embodiments of the presently disclosed system and method readily suggest themselves to such skilled persons having the assistance of this disclosure. In the following description, certain specific details are set forth in order to provide a thorough understanding of various disclosed embodiments or implementations. However, one skilled in the relevant art will recognize that embodiments or implementations may be practiced without one or more of these specific details, or with other methods, components, materials, etc. In other instances, well-known structures associated with the various embodiments or implementations have not been shown or described in detail to avoid unnecessarily obscuring descriptions of the embodiments or implementations.

Each of the features and teachings disclosed herein can be utilized separately or in conjunction with other features and teachings to provide a 3D animation design environment in which a model is partitioned into composite polygons to form a polygon mesh. Although the technology disclosed herein relates primarily to animating characters, it will be appreciated that the technology and techniques can be applied to any graphic media using alterable shapes; for example, CAD/CAM and other industrial drawings, radiological media, GPS mapping, engineering, fashion, film, and other graphics related technologies. Representative examples utilizing many of these additional features and teachings, both separately and in combination, are described in further detail with reference to attached FIGS. 2-8. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Unless the context requires otherwise, throughout the specification and claims that follow, the word "comprising" is synonymous with "including," and is inclusive or open-ended (i.e., does not exclude additional, unrecited elements or method acts). The term "herein" refers to the specification, claims, and drawings associated with the current application. As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise. The term "based on" is not exclusive and allows for being based on additional features, functions, aspects, or limitations not described, unless the context clearly dictates otherwise.

Reference throughout this specification to "one embodiment," "an embodiment," "one implementation," or "an implementation" means that a particular feature, structure or characteristic described in connection with the embodiment or implementation is included in at least one embodiment or implementation. Thus, the appearances of the phrases "in one embodiment," "in an embodiment," "one implementation," or "an implementation" in various places throughout this specification are not necessarily all referring to the same embodiment or implementation. Furthermore, the particular features, structures, or characteristics may be combined in any suitable manner in one or more embodiments or implementations.

The headings and Abstract of the Disclosure provided herein are for convenience only and do not interpret the scope or meaning of the embodiments or implementations.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a self-consistent sequence of steps leading to a desired result.

The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages and a variety of 3D programming or design environments may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Systems and methods for enhancing 3-D modeling using dynamic partitioning are described below. More particularly, in some implementations, the vertices used to depict a 3-D model are partitioned into multiple, different vertices sets based on the values assigned to each vertex for one or more color variables. These systems and methods may be used to partition any type of shape, including asymmetrical shapes, into multiple regions. For example, in one implementation, this technology enables a CG artist to partition any geometric shape into multiple regions using the vertex color to assign each vertex to either a top region or a bottom region. Likewise, in another implementation, the vertex color value may be used to assign each vertex to either a left region or a right region of a blend shape model. Generally, the blend shape may be partitioned into different regions along any axis.

In some implementations, the variables corresponding to the red color channel in each vertex of a 3-D model may be clamped to be between zero (0.0) and one (1.0). A CG artist may partition the 3-D model into different regions using the value of the red color channel variable for each vertex. In addition, in some implementations, the developer may use the value of the red color channel variable to control the transition, or fall-off, between regions in which change occurs and for those regions that remain the same.

Moreover, the CG artist may easily control the process of partitioning the 3-D model into different regions and controlling the fall-off between the regions by changing the red color channel values assigned to each vertex. Other color channels such as blue and green also may be used alone or in any combination with the red, blue or green color channels to partition the 3-D model into various different regions. Accordingly, the ability to dynamically partition the 3-D model into multiple different regions, including asymmetrical regions, provides the CG artist with a greater degree of flexibility and efficiency when animating the 3-D model and developing blend shapes. These systems and methods further provide automated techniques that enable CG artists to more quickly and efficiently partition the 3-D model into the different regions.

Figure 2:
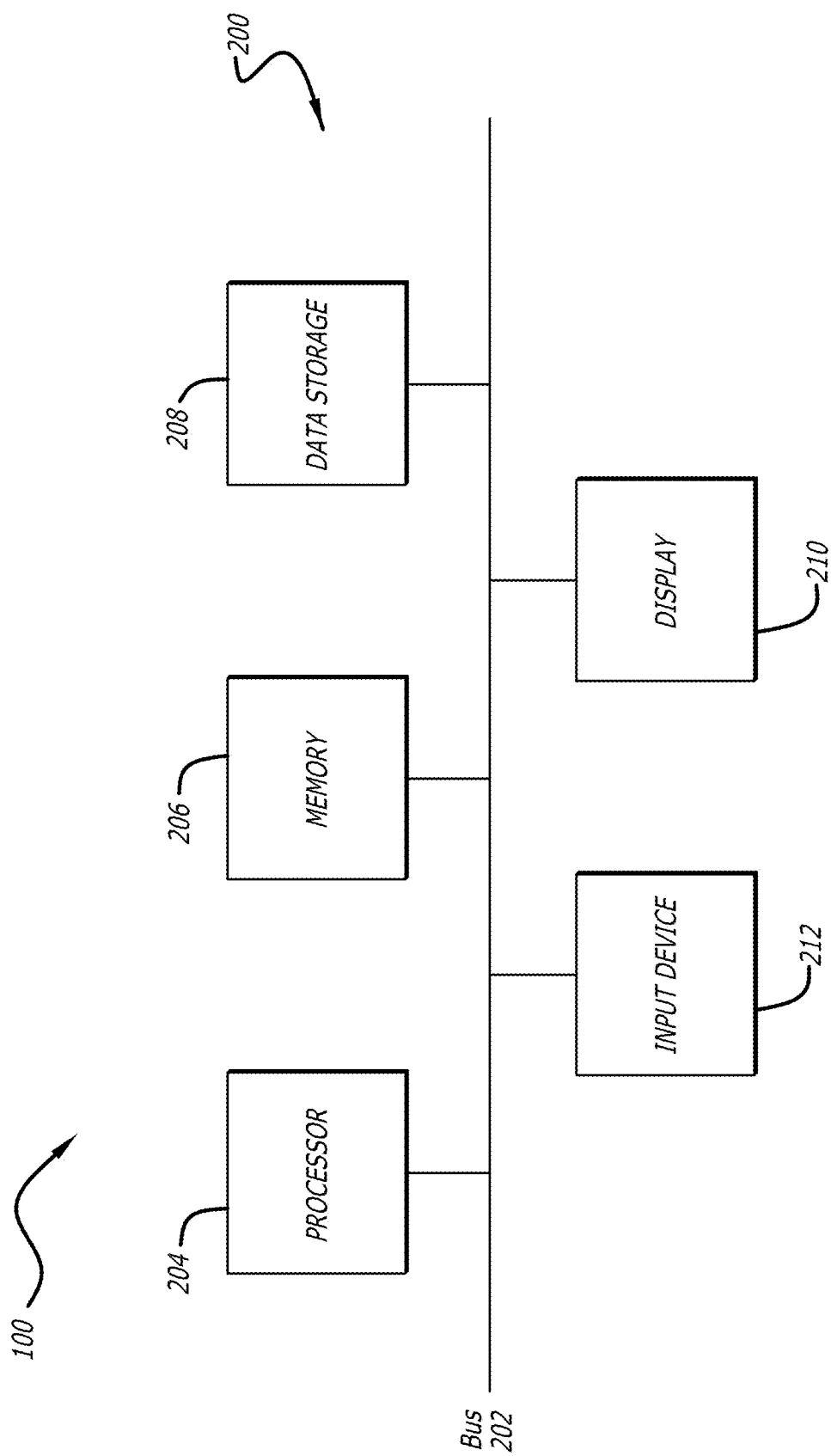
FIG. 2 is a block diagram of a design space system usable to generate blend shapes from a base shape and one or more driving shapes, according to at least one illustrated embodiment.

Referring to FIG. 2, a design space system 100 generally includes a computer system 200 for generating blend shapes according to the techniques described herein. The computer system 200 includes a bus 202 connecting a processor 204, a memory 206, data storage 208, a display 210 and an input device 212. Generally, this relates to a conventional von Neumann architecture; however, one skilled in the art will appreciate that the techniques described herein are equally applicable to other computer architectures, such as, for example, computer systems having separate data and instruction buses. The computer system 200 includes instructions stored in data storage 208, or on any other computer-readable medium. When executed, these instructions configure the computer system 200 to enable the processor 204 to determine the appropriate color channel value for each vertex and to partition the 3-D model into different regions based on these values. The instructions may further configure the computer system 200 to enable the processor 204 to deform the 3-D model into various blend shapes in which the deformation of each region depends upon the color channel value assigned to the vertices in each region and to store the various blend shapes in memory 206. The processor 204 displays the resulting blend shapes stored in memory 206 by rendering the blend shape to be viewed using the display 210. In one implementation, base shapes and driving shapes are entered using an input device 212, including, but not limited to a mouse, a keyboard, and/or some combination thereof. More particularly, the input device 212 may be embodied as one or more of the following: a keyboard, a mouse, a trackball, a track pad, a gyroscopic point device, and the like.

The processor 204 includes any device, such as, for example, those processors commonly used in personal computers, laptops, and/or mobile devices, capable of executing instructions to determine the appropriate color channel value for each vertex in the 3-D model and to partition the 3-D model into different regions based on these values. Furthermore, the processor 204 may include multiple cores for simultaneous and parallel execution.

Figure 3:
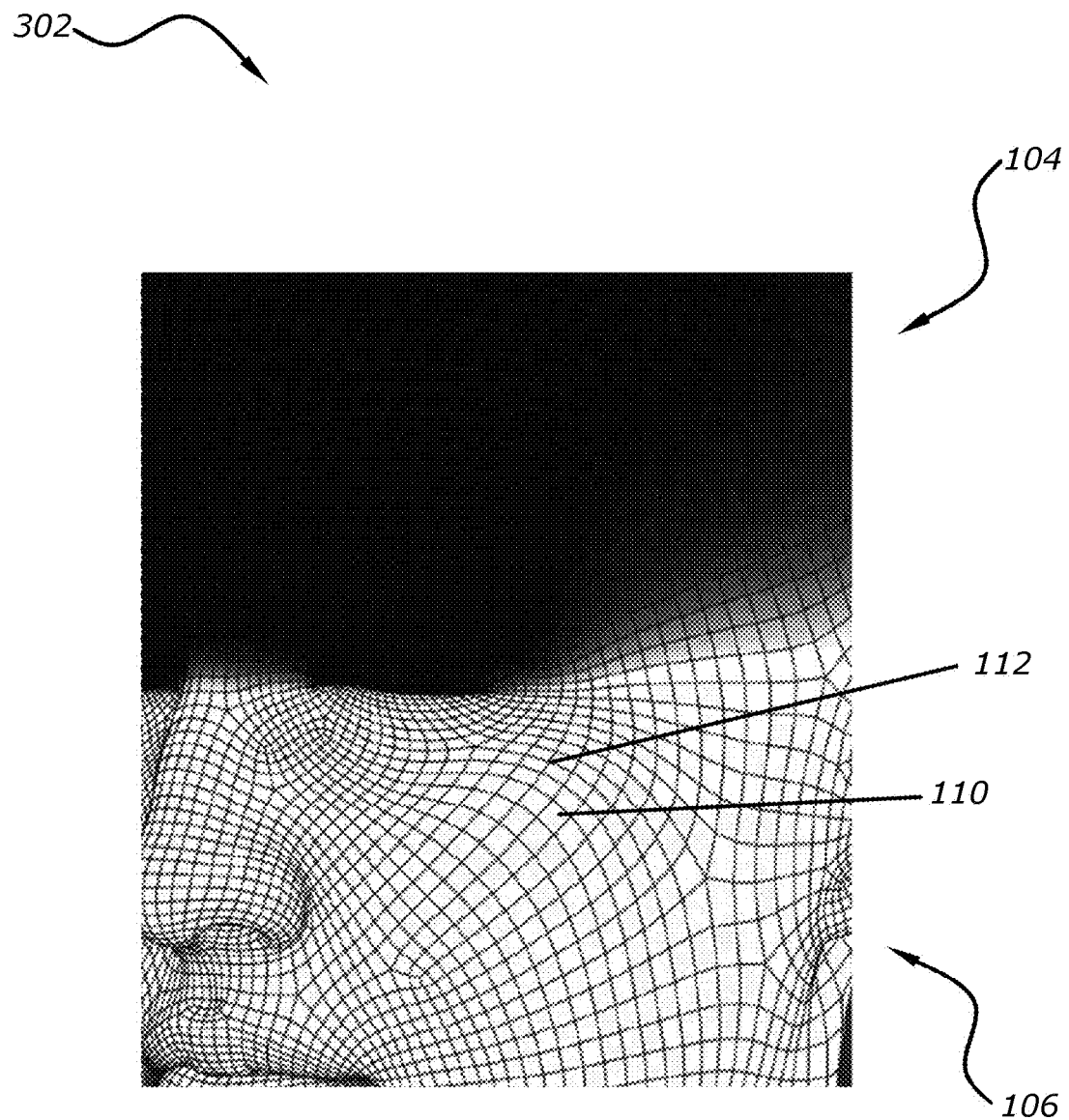
FIG. 3 is an illustration of a base shape that is partitioned between a top region and a bottom region as shown in a design space system for designing and rendering 3-D animation, according to at least one illustrated embodiment.

FIG. 3 is an illustration of an expression shape 302 partitioned between a top region 104 and a bottom region 106 as shown in the design space system 100 for designing and rendering 3-D animation, according to at least one illustrated embodiment. The expression shape 302 may be partitioned into a set of non-overlapping polygons 110 that are formed by a set of corresponding vertices 112. The vertices in the top region 104 and the vertices in the bottom region 106 may be determined based upon the value of the red color channel assigned to each vertex 112 in the expression shape 302. In some implementations, a different color channel value, such as the blue color channel or the green color channel or any other appropriate color channel (e.g., cyan color channel, magenta color channel, yellow color channel, or black color channel), is used to partition the 3-D model into different regions. In some implementations, the alpha channel in the RGB color space may be used to partition the 3-D model into different regions. In some implementations, multiple color channels and/or combinations thereof are used to apply multiple masks to the 3-D model, each mask including a plurality of regions.

As further shown in FIG. 3, the design space system 100 may clamp the value of the red color channel to be either zero (0) or one (1) for each vertex 112. In some implementations, the design space system bounds the value of the red color channel to be a decimal value between zero (0.0) and one (1.0) for each vertex 112. Further, in some implementations, the design space system 100 stores each color channel value as an integer between zero (0) and two-hundred, fifty-five (255). In this situation, the design space system 100 divides the color channel value used to specify the top region 104 and the bottom region 106 by two-hundred, fifty-five to convert the color channel value into a fraction. The design space system 100 thus allows a CG artist to apply a value of between zero and one to the red color channel for each vertex 112, and to use that value to partially or fully associate each vertex 112 with either the top region 104 and/or the bottom region 106 of the 3-D model.

In some implementations in which the design space system 100 clamps the value to be either zero or one, the vertices 112 may be assigned to a top set of vertices or to a bottom set of vertices according to calculations performed on the red color channel value for each vertex 112. For example, in some implementations, the design space system 100 may partition the vertices 112 in the expression shape 302 into different sets using the following calculations:

$$T = \{\forall i \in V : c_{i,r} \times p_{i\text{-}Top}\}$$

$$B = \{\forall i \in V : (1 - c_{i,r}) \times p_{i\text{-}Bottom}\} \quad \text{Eq. 1}$$

In this equation, "T" represents the set of vertices 112 in the top region 104, and "B" represents the set of vertices 112 in the bottom region 106. Further, the term "i" represents the i-th vertex in the set of vertices, "V," that are used to form the expression shape 302. Thus, as shown in Equation 1, for every vertex "i" in the set of vertices "V," the design space system 100 multiplies the red color channel value assigned to vertex "i" ($c_{i,r}$) by the positional change value for vertex "i" ($p_{i\text{-}Top}$) associated with the top region 104 to determine the amount of change to the i-th vertex contributed by the deformation of the top region 104. Similarly, for every vertex "i" in the set of vertices "V," the design space system 100 subtracts the red color channel value assigned to vertex "i" ($c_{i,r}$) from one (1) to determine a difference. Finally, the equation multiplies this difference by the positional change value for vertex "i" ($p_{i\text{-}Bottom}$) associated with the bottom region 106 to determine the amount of change to the i-th vertex contributed by the deformation of the bottom region 106.

FIG. 4A is an illustration of an expression shape 302 showing a first division between the top region 404 and the bottom region 406, according to at least one illustrated embodiment. As shown in FIG. 4A, a first set of vertices 402 in the expression shape 102 have been painted to have a red color channel value of 1.0. Accordingly, this first set of vertices 402 is included in the T-set of vertices that denote the top region 404. A second set of vertices 410 in the expression shape 302 have a red color channel value of 0.0. Accordingly, the second set of vertices 410 is included in the B-set of vertices that denote the bottom region 406. As implemented in FIG. 4A, the vertices in the first set 402 do not overlap with the vertices in the second set 410. As shown in FIG. 4A, a line 414 between the top region 404 and the bottom region 406 traverses the lower part of the 3-D model's eyes and across the bridge of its nose.

FIG. 4B illustrates the same expression shape 302 as illustrated in FIG. 4A, but with a line 416 marking a desired division between the top and bottom regions. As shown in FIG. 4B, the line 416 traverses the cheeks of the 3-D model. Further, FIG. 4B shows a set of vertices 418 between line 414 and line 416 that are to be associated with the top region 404 instead of the bottom region 406. In some implementations, the design space system 100 allows a user (e.g., a CG artist) to alter the association of a set of vertices between the top region 404 and the bottom region 406 by changing the value of the red color channel for each vertex in that set of vertices. Thus, to change the association of the set of vertices 418 from the bottom region 406 to the top region 404, or vice versa, the user merely changes the value of the red color channel from zero to one for each vertex within the set of vertices 418.

FIG. 4C illustrates the same expression shape 302 as illustrated in FIG. 4A and FIG. 4B, but with a new division between a top region and a bottom region shown, according to at least one illustrated embodiment. As shown in FIG. 4C, when the design space system 100 has changed the value of the red color channel from zero to one for each vertex within the set of vertices 418, the design space system 100 now includes the vertices in the set of vertices 418 with the T-set of vertices that denote an updated, expanded top region 430. The remaining vertices below line 416 remain in the set of vertices that denote the updated, smaller bottom region 432. The design space system 100 enables the user to further modify the line between the top region and the bottom region by changing the value for the red color channel for the appropriate vertices to either a one to associate vertices with the top region or a zero to associate vertices with the bottom region.

In some implementations, the design space system 100 stores in memory the values associated with the T-set and the B-set as an array. In some implementations, the design space system 100 may store an identification of a vertex as being in either the T-set or the B-set with positional data, such as the positional location associated with that vertex. The design space system 100, alternatively, may identify only those vertices that are included in one of either the top region or the bottom region. If a vertex is not associated with the identified region, such as the top region, then the design space system 100 may associate the vertex with the other region, such as the bottom region. In this alternative, in which vertices are identified for only one region, the design space system 100 uses comparatively less memory than if the design space system 100 identified the appropriate region for each and every vertex 112.

Figure 5A:
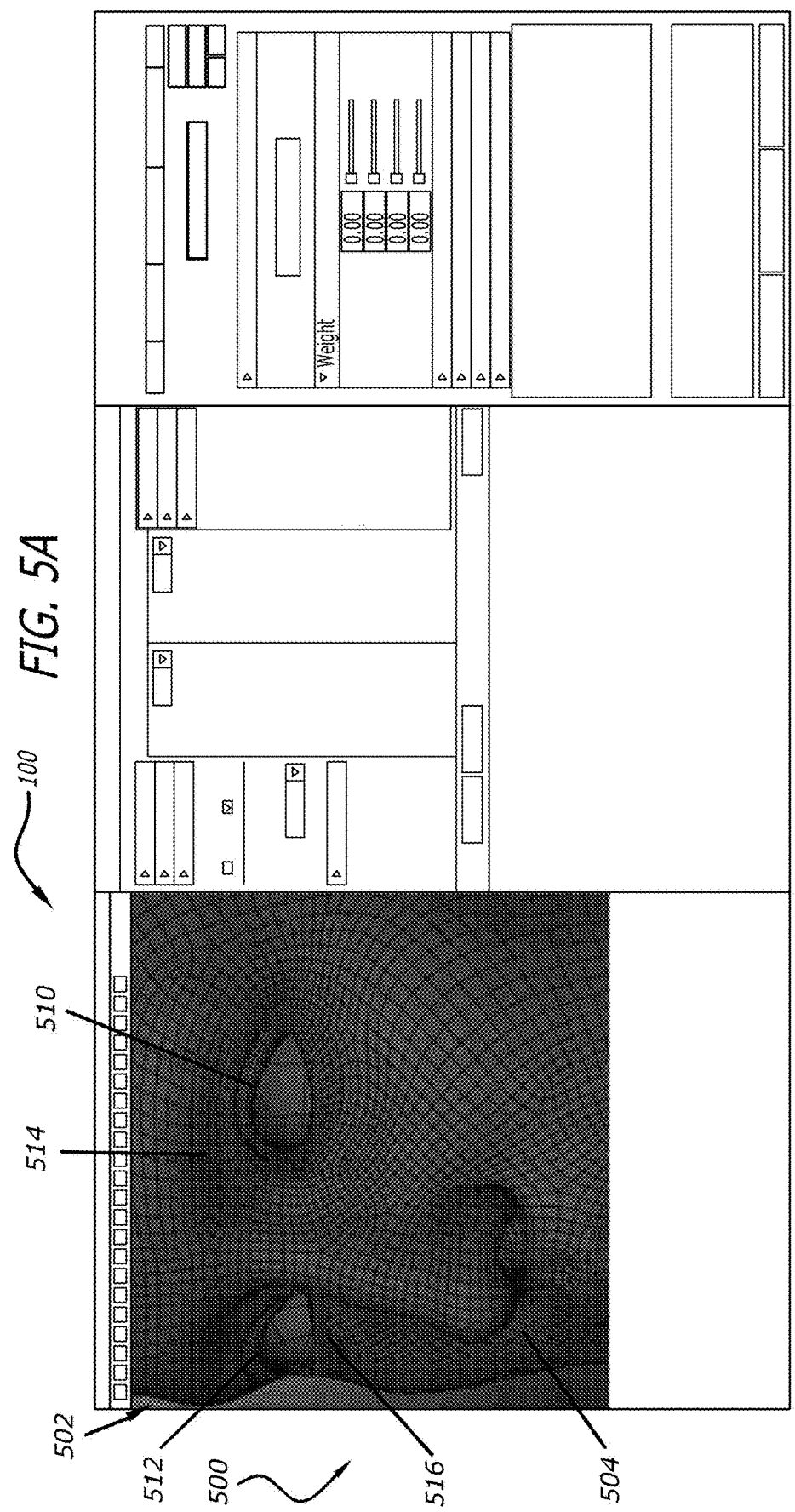
FIG. 5A illustrate a 3-D model in the design space system in which the 3-D model has been partitioning into a top region and a bottom region to provide the user with the ability to apply a varying range of movement to the different regions, according to at least one illustrated embodiment.

FIG. 5A illustrates a 3-D model 500 in the design space system 100 in which the 3-D model 500 has been partition into a top region 502 and a bottom region 504 to provide the user with the ability to apply a varying range of movement to the different regions, according to at least one illustrated embodiment. The 3-D model 500 corresponds to an expression shape 302 that has been partitioned into a top region 502 and a bottom region 504 using the techniques described above. The design space system 100 enables the user to separately control the features in the top region 502 from the features in the bottom region 504 of the 3-D model 500. The top region 502 includes upper eyelids 510 and 512, as well as an eyebrow 514. The bottom region 504 includes lower eyelids 516. The deformation of both the top region 502 and the bottom region 504 may be based on the contribution of the driving shape 152. The technique described herein enables the user to specify different weights from the driving shape 152 for the top region 502 and for the bottom region 504.

FIG. 5B illustrates the 3-D model 500 in the design space system 100 in which only the top region 502 has been deformed according to the driving shape 152, according to at least one illustrated embodiment. As shown in FIG. 5B, the amount of deformation to apply to the top region 502 may be determined based upon a slider 520 that enables the developer to specify the weight or amount of deformation to be applied to the top region 502 of the 3-D model 500 based on the driving shape 152. In some implementations, the slider 520 may move between a zero (0) position and a one (1) position. When the slider 520 is in the zero position, the top region 502 of the 3-D model 500 is in the same position as the top region 502 of the base shape 102 with no weight or input provided by the driving shape 152. When the slider 520 is in the one position, the top region 502 of the 3-D model 500 is in the same position as the top region 502 of the driving shape 152. When the slider 520 is between zero and one, then the top region 502 of the resulting 3-D model 500 is in a position or state that represents a transition between the base shape 102 and the driving shape 152. The value specified by the slider 520 corresponds to the amount of transition of the top region 502 to be attributed to the driving shape 152. In some implementations, the slider 520 may have values less than zero or greater than one. In these implementations, the contribution or weight of the slider 520 may be provided by the following equation:

$$f(w) = \frac{w - sliderFramestart}{sliderFramewidth} \qquad \text{Eq. 2}$$

In this equation, the value of w equals the value set for the slider; sliderFramestart equals the starting value for the slider bar; and sliderFramewidth equals the total width for the slider bar.

FIG. 5C illustrates the 3-D model 500 in the design space system 100 in which only the bottom region 504 has been deformed according to the driving shape 152, according to at least on illustrated embodiment. As shown in FIG. 5C, the amount of deformation to apply to the bottom region 504 may be determined based upon a slider 522 that enables a developer to specify the weight or amount of deformation to be applied to the bottom region 504 of the 3-D model 500 based on the driving shape 152. In some implementations, the slider 522 may move between a zero (0) position and a one (1) position. When the slider 522 is in the zero position, the bottom region 504 of the 3-D model 500 is in the same position as the bottom region 504 of the base shape 102 with no weight or input provided by the driving shape 152. When the slider 522 is in the one position, the bottom region 504 of the 3-D model 500 is in the same position as the bottom region 504 of the driving shape 152. When the slider 522 is between zero and one, then the bottom region 504 of the resulting 3-D model 500 is in a position or state that represents a transition between the base shape 102 and the driving shape 152. The value specified by the slider 522 corresponds to the amount of transition to the bottom region 504 to be attributed to the driving shape 152 as noted above in Equation 2.

FIG. 5D illustrates the 3-D model 500 in the design space system 100 in which both the top region 502 and the bottom region 504 have been deformed according to the driving shape 152, according to at least one illustrated embodiment. As noted above, the slider 520 provides the user with the ability to control the amount of deformation of the top region 502 to be contributed by the driving shape 152. Similarly, the slider 522 provides the user with the ability to control the deformation of the bottom region 504 to be contributed by the driving shape 152. The user may independently set the two sliders 520 and 522, thus specifying different weights to be applied from the driving shape 152 to the top region 502 and the bottom region 504. This division provides the user with greater control over the expressions that can be rendered on the 3-D model with one or a handful of driving shapes. Moreover, the division between the top region 502 and the bottom region 504 may be quickly and efficiently changed by the user or the design space system 100 by switching the red color channel for the appropriate vertices 112 within the 3-D model 500.

Figure 6:
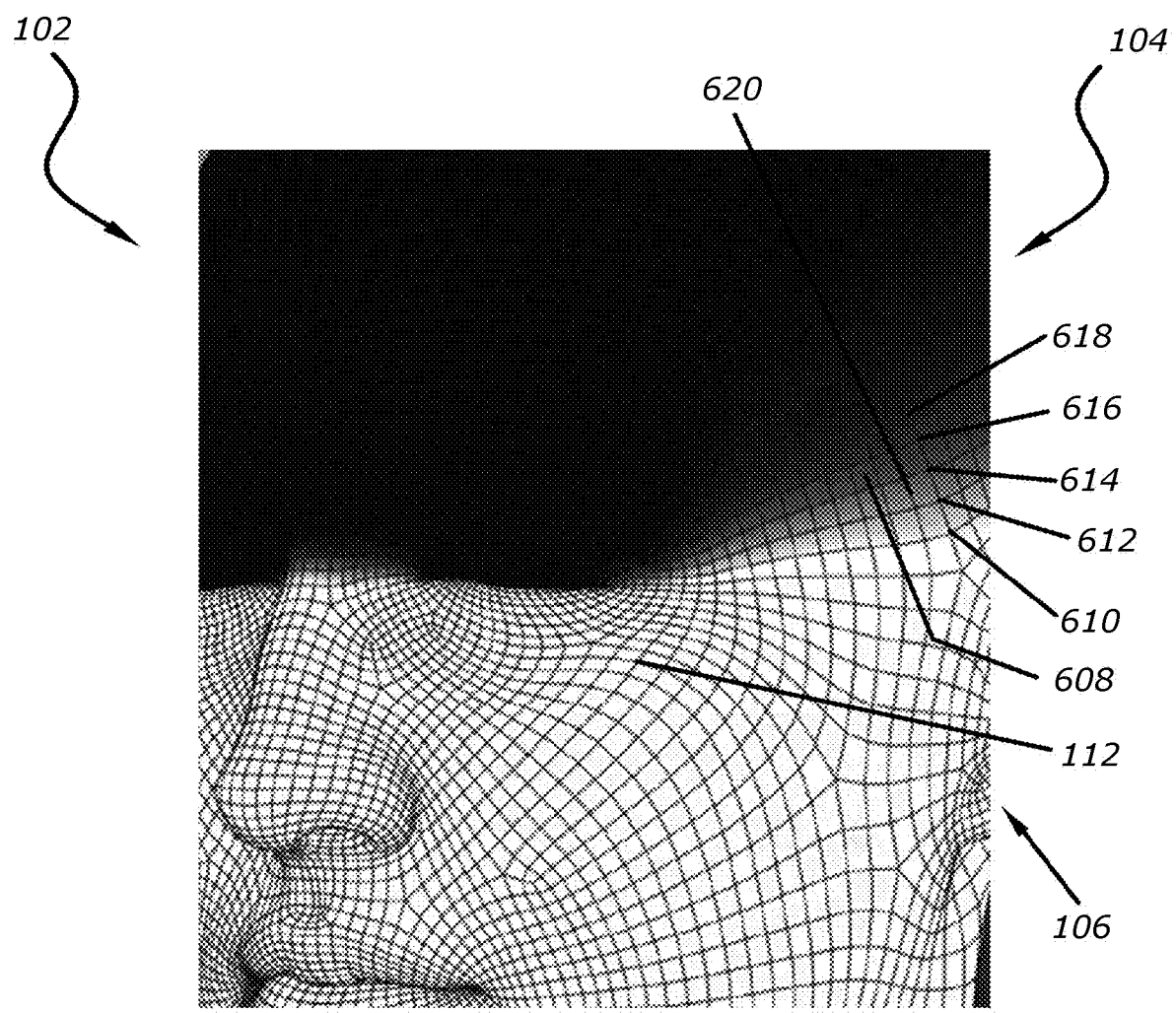
FIG. 6 illustrates a base shape that includes a transition, or fall-off, region between the top region and the bottom region in the base shape, according to at least one illustrated embodiment.

FIG. 6 illustrates a base shape 102 in which the design space system 100 implements a transition, or fall-off, region 608 between the top region 104 and the bottom region 106 in the expression shape 302, according to at least one illustrated embodiment. The fall-off region 608 provides a more realistic depiction from a resulting blend shape model as compared to prior art systems. The design space system 100 may determine the extent and characteristics of the fall-off region in a number of ways. For example, the design space system 100 may apply a smoothing filter, such as a low-pass filter, to the values of the red color channel (or whatever color channel is being used) for the vertices 112 in the expression shape 302 to create the fall-off region 508 between the top region 104 and the bottom region 106. The user can modify the parameters of the smoothing filter to adjust the size of the fall-off region 608. In addition, the design space system 100 may enable the user to apply different filters (or no filter) to different portions of the expression shape 302, thereby providing the user with greater control over the size and the extent of the fall-off region across the expression shape 302. Alternatively, the design space system 100 may provide other tools beside a low-pass filter that enables a user to blur or smooth sharp transitions in images or models.

The design space system 100 uses the fall-off region 608 to smooth the transition between the various regions of the 3-D model in which different rates of movement occur. In some implementations, the transition may be linear across the fall-off region 608. For example, as shown in FIG. 6, vertex 610 marks a transition from the fall-off region 608 to the bottom region 106, and vertex 618 marks a transition from the fall-off region 608 to the top region 104. In this example, the design space system 100 may calculate a total distance 520 between vertex 610 and vertex 618, and use that total distance to apply a linear transition across the vertices 612, 614, and 616 as the base shape 102 is deformed based on a contribution of the driving shape 152. In this example, the distance between the vertex 610 and the vertex 612 may be 25% of the total distance 620; the distance between the vertex 610 and the vertex 614 may be 50% of the total distance 620; and the distance between the vertex 610 and the vertex 616 may be 75% of the total distance 620. Accordingly, when the top region 104 of the base shape 102 moves according to a contribution from the driving shape 152 and the bottom region 106 remains stationary, the design space system 100 may move vertex 612 twenty-five percent (25%) of the movement it would otherwise make absent the top-bottom masking according to the contribution of the driving shape 152; the design space system 100 may move the vertex 614 fifty percent (50%) of the movement it would otherwise make absent the top-bottom masking according to the contribution of driving shape 152; and the design space system 100 may move the vertex 616 seventy-five percent (75%) of the movement it would otherwise make according to the contribution of the driving shape 152.

In some implementations, the CG artist may specify the fall-off region 608 by assigning an appropriate value to the red color channel (or whatever color channel is being used) for each vertex in the fall-off region 608. For example, if the design space system 100 assigns color channels values between zero and one, then the fall off region 608 may include those vertices having a fractional value that is between zero and one. Moreover, the fractional value can specify the fractional contribution from the top region 104 and the fractional contribution of the bottom region 106 in deforming each vertex in the fall-off region. Thus, the total change, "d," to a vertex "i" in the fall-off region 608 is specified by the following equation:

$$d = (c_{ir})(p_{i\text{-}Top}) + (1 - c_{ir})p_{i\text{-}Bottom} \qquad \text{Equation 3}$$

In Equation 3, $c_{ir}$ represents the red color channel value assigned to vertex "i," $p_{i\text{-}Top}$ represents the positional change value for vertex "i" associated with the top region 104, and $p_{i\text{-}Bottom}$ represents the positional change value for vertex "i" associated with the bottom region 106.

In some implementations, the design space system 100 assigns colors based on values between zero and 255. Accordingly, the design space system 100 divides the value of the appropriate color channel value by 255 to make it a fraction between zero and one, inclusive. Thus, for example, if the CG artist set the red color value for a vertex to 85, then the design space system 100 would divide 85 by 255, which equals ⅓. According to Equation 3, one-third of the deformation of the top region will be applied to this vertex (⅓×$p_{i\text{-}Top}$). Further, according to Equation 3, two-thirds of the deformation of the bottom region will be applied to this vertex (⅔×$p_{i\text{-}Bottom}$). Accordingly, the overall change for that vertex would be:

$$d = \tfrac{1}{3}(p_{i\text{-}Top}) + \tfrac{2}{3}(p_{i\text{-}Bottom}) \qquad \text{Equation 4}$$

Figure 7:
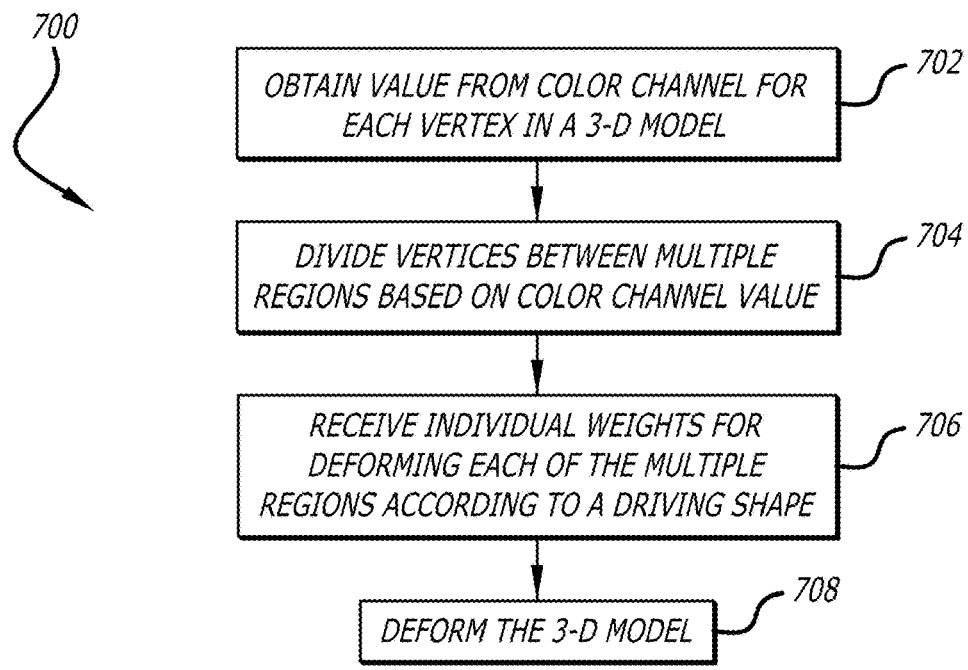
FIG. 7 is a logic flow diagram showing an example method for partitioning a 3-D model into multiple regions by a design space system, according to at least one illustrated embodiment.

FIG. 7 is a logic flow diagram showing an example method 700 for partitioning a 3-D model into multiple regions by the design space system 100, according to at least one illustrated embodiment. In 702, the value from an appropriate color channel for each vertex in the 3-D model is obtained by the design space system 100. The color channel may be any color channel used to represent colors in a 3-D design space system 100. For example, the appropriate color channel in some implementations may comprise any or all color channels in any color space (e.g., the red color channel, the blue color channel, or the green color channel, or the cyan color channel, the magenta color channel, the yellow color channel, or the black color channel) including the alpha channel. In some implementations, multiple color channels may be used to partition the 3-D model into multiple regions. The value for the selected color channel may have previously been set for each vertex in the 3-D model to be between zero and one. This action of setting the value of the appropriate color channel may have been performed automatically, or it may have been performed by a user interacting with the 3-D model through the design space system 100.

In 704, calculations are performed by the design space system 100 to partition the vertices between at least a first region and a second region. The regions may be partitioned along any line or axis. For example, the two regions may be vertically aligned with a top region and a bottom region. Alternatively, the two regions may be horizontally aligned with a left region and a right region. Because the user may set the values of the appropriate color channel individually for each vertex, the partition between regions may be non-linear, such as, for example, following one or more contours that traverse the 3-D model.

In some implementations, the design space system 100 may partition at least some vertices into a fall-off region that is positioned between the first region and the second region. In some implementations, the design space system 100 may include all vertices having a value that is greater than zero and less than one (1) for the appropriate color channel. The user may set this value, or alternatively, the design space system 100 may set this value automatically by applying one or more functions, such as a smoothing function or a low-pass filter, to the color channel values.

In 706, the design space system 100 receives individual weights for deforming the first region and the second region according to a driving shape. The weights specify the contribution of the driving shape to each region of the 3-D model. In some implementations, each weight is specified by a user interacting with the design space system 100. In such implementations, each weight is input by the user using a separate slider, where the first region and the second region each has an associated slider for the driving shape. Each slider is positioned to equal a value between zero and one in which an increasing value assigned by the slider corresponds to an increasing contribution by the associated driving shape to region associated with the slider.

In 708, the weights received in 706 are processed by the design space system 100 to deform the 3-D model according to the driving shape. The contribution of the driving shape in deforming a region of the 3-D model is determined in some implementations by multiplying the weight received in 706 for the region with the positional change specified by the driving shape for the vertex in the region. This process continues for each of the regions, including any fall-off regions, in the 3-D model for which a driving shape has been specified and an associated weight has been received. The method ends after 708.

Figure 8:
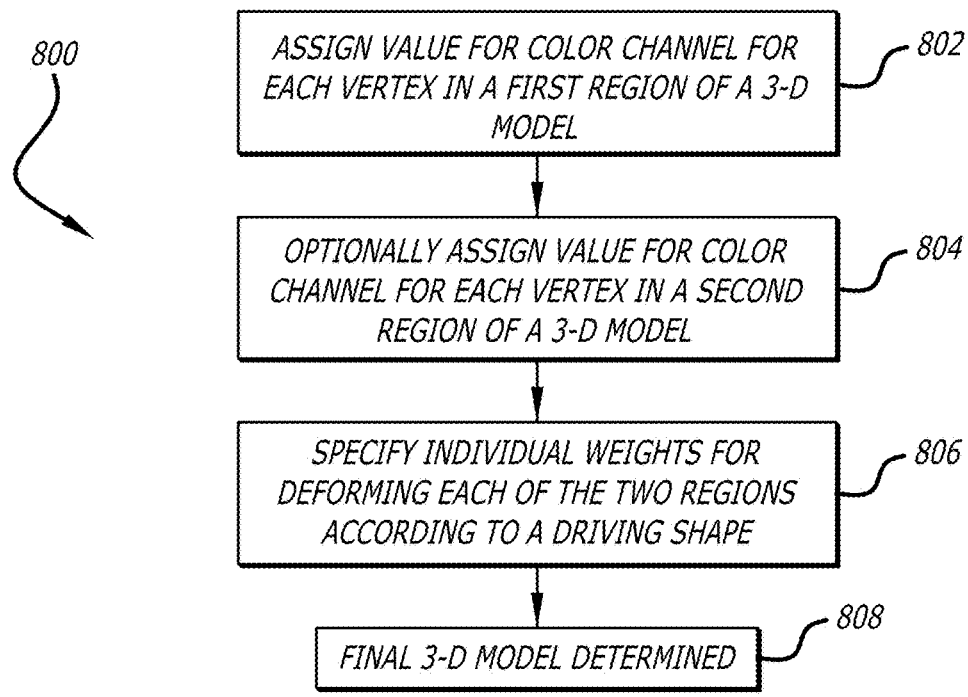
FIG. 8 is a logic flow diagram showing an example method for partitioning a 3-D model into multiple regions by a designer using the design space system, according to at least one illustrated embodiment.

FIG. 8 is a logic flow diagram showing an example method 800 for partitioning a 3-D model into multiple regions by a designer using the design space system 100, according to at least one illustrated embodiment. In 802, a user identifies a first region by assigning to each vertex in the first region a first value, e.g., one (1), to one of the color channels provided by the design space system 100.

In 804, the remaining vertices are partitioned into a second region that does not overlap with the first region. In some implementations, the partitioning is performed automatically after the vertices for the first region are identified by assigning all remaining vertices to the second region. In some implementations, a user identifies the vertices for the second region by assigning to each vertex in the second region a second value, e.g., zero (0), for the same color channel used in 802.

In 806, the user specifies individual weights for deforming the first region and the second region according to a driving shape. The weights specify the contribution of the driving shape to each region of the 3-D model. In some implementations, the user interacts with individual, separate sliders, where each region has an associated slider for the driving shape. Each slider is positioned to equal a value between zero and one in which an increasing value assigned by the slider corresponds to an increasing contribution by the associated driving shape to region associated with the slider.

In 808, the final 3-D model is determined based on the base shape, the specified regions, the driving shape, and the weights.

Figure 9:
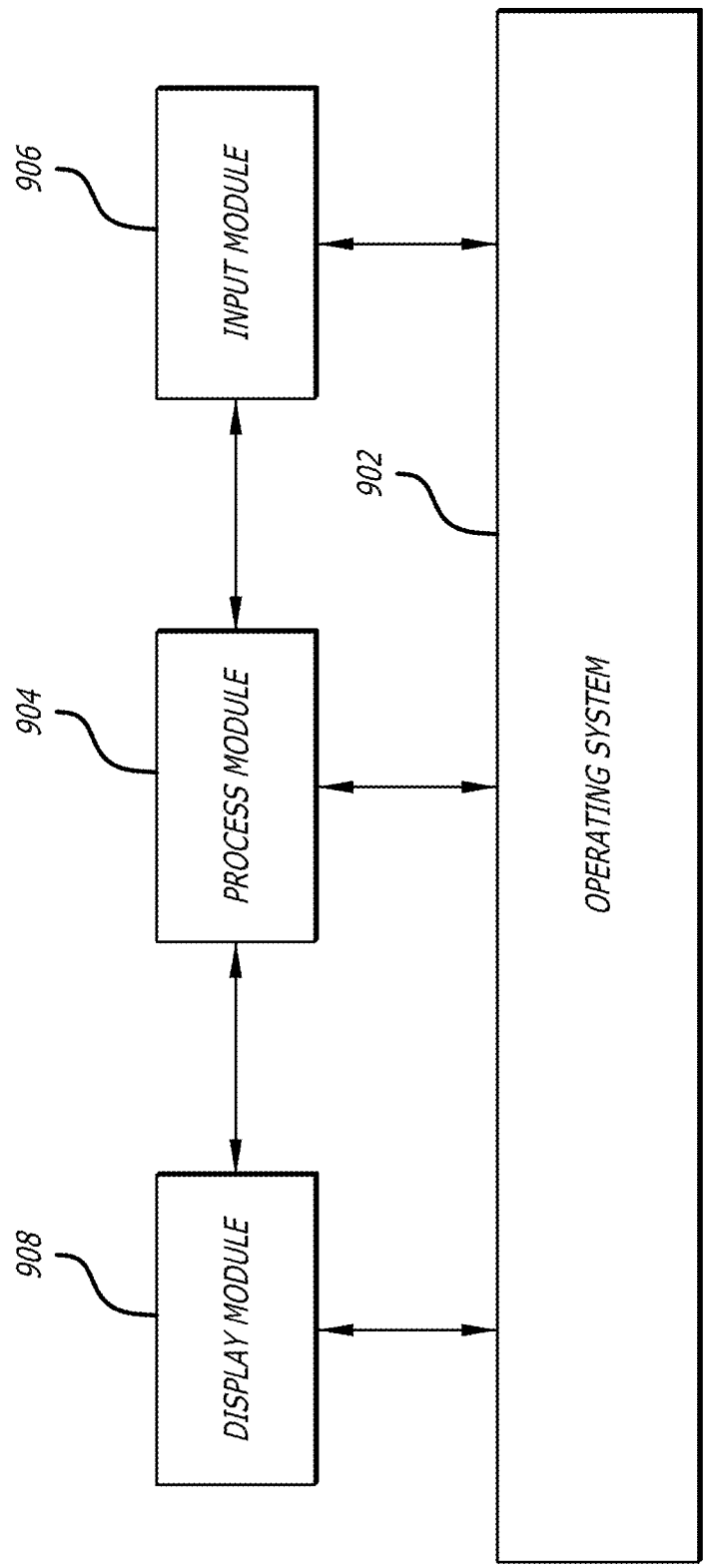
FIG. 9 is a block diagram of a system for partitioning a 3-D model into a plurality of regions and applying different weights from a driving shape to individually deform each region, according to at least one illustrated embodiment.

FIG. 9 is a block diagram of a system for partitioning a 3-D model into a plurality of regions and applying different weights from a driving shape to individually deform each region. Software for using a base shape and one or more driving shapes to construct a 3-D model includes an operating system 902 providing an environment for a process module 904 to interact with various components and peripherals of the system. The process module 904, the input module 906, and the display module 908 each interact with the operating system 902 and each other so as to determine the positional information for each vertex in the 3-D model. For example, the process module 904 implements a graphical user interface. User input, such as the base shape, the regions for the base shape, the driving shape, or the various weights for each region, is received by the operating system 902 and processed by the input module 906 to determine the resulting 3-D model. For example, when a user moves a mouse, the operating system 902 processes the movement and displays a pointer on the display 210. When a user clicks a button on the mouse, or other input device so as to indicate a selection, the input module 906 receives and processes the input, and the process module 904 updates data structures appropriately.

Data associated with base shapes, driving shapes, and 3-D models are stored on a computer-readable medium, such as, for example, random-access memory, a hard drive, flash memory, or the like. The memory can be located either locally or remotely to the system. Data associated with base shapes, driving shapes, and 3-D models may be stored in data structures that may be generated by process logic in the course of determining the different regions of the base shape or determining the modified positional information for each vertex.

The techniques and methods for dynamic partitioning of a base shape into multiple regions described herein provide technical improvements to enhance 3-D design capabilities. One such technical improvement enables the design space system 100 to provide CG artists with a quick and efficient method for partitioning asymmetrical 3-D models into two or more regions. In current methods, a CG artist generally needs to bake a deformation from the base shape into the modified shape if the CG artist only wants part of the 3-D model to be deformed based on a driving shape. Dynamic partitioning as described herein, by contrast, removes this additional burden from the CG artist. For example, dynamic partitioning allows a CG artist to quickly and efficiently specify different regions for a 3-D model by modifying a color channel value. Dynamic partitioning further allows a CG artist to quickly re-assign vertices from one region to another region by changing the value for the vertex using the appropriate color channel. Once the appropriate color channel values have been set for the vertices in at least one region of the 3-D model, the CG artist may assign different weights for a driving shape for each region. Moreover, U-V assignments for the blend shapes are quickly and automatically determined according to the weights assigned to each driving shape. Accordingly, a developer or CG artist can customize the graphics to be applied to a blend shape in various ways. In addition, dynamic partitioning enables the user to specify a fall-off region to smooth the transition between regions of the 3-D model that move and regions that do not move. This transition enables the 3-D model to have a more realistic effect.

The techniques and methods for dynamic partitioning can be used in other technology and situations in which graphics and movement are applied to a 3-D model comprising a polygon mesh. For example, dynamic partitioning may be used on other parts of the body or other shapes in a 3-D model that are asymmetrical.

The technologies and methods disclosed in the above specification enable a user to quickly and easily partition a 3-D model into a plurality of regions by using the value of one or more of the color channels for each vertex in the 3-D model. These technologies and methods also allow a user to quickly and efficiently modify the position of a line or marking that separates the two regions of the 3-D model. In addition, the disclosed technology may provide a fall-off region to allow a gradual transition between the various regions. The system allows for more efficient memory usage by storing only those vertices that meet the conditions for one of the regions. Finally, the technologies and methods described herein provide the user with a more efficient and effective manner to apply different contributions from the driving shape to each of the individual regions. The technologies and methods thus provide the user with a greater degree of control for modifying the 3-D object. The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The various implementations described above can be combined to provide further implementations. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, if any, are incorporated herein by reference, in their entirety. Aspects of the embodiments can be modified, if necessary, to employ concepts of the various patents, applications and publications to provide yet further embodiments. These and other changes can be made to the implementations in light of the above-detailed description.

These and other changes can be made to the embodiments in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for dynamically modifying a 3-D model, the 3-D model having a plurality of vertices, the method comprising:
    obtaining a color channel value for each vertex in the 3-D model;
    partitioning the vertices in the 3-D model between a first set of vertices that defines a first region of the 3-D model that comprises a first set of a plurality of polygons and a second set of vertices that defines a second region of the 3-D model that comprises a second set of a plurality of polygons, wherein the partitioning occurs based on the color channel value for each vertex, wherein the first region and the second region are distinct non-overlapping regions each containing a plurality of non-overlapping polygons, and wherein none of the first set of a plurality of polygons in the first region of the 3-D model overlap with any of the second set of a plurality of polygons in the second region of the 3-D model;
    receiving a first weight contribution value associated with a driving shape;
    deforming the vertices in the first region according to the first weight contribution value;
    obtaining a second color channel value for each vertex in the 3-D model;
    partitioning the vertices in the 3-D model between a third set of vertices that defines a third region of the 3-D model and a fourth set of vertices that defines a fourth region of the 3-D model, wherein the partitioning occurs based on the second color channel value for each vertex;
    receiving a third weight and a fourth weight associated with a second driving shape;
    deforming the vertices in the third region according to the third weight; and
    deforming the vertices in the fourth region according to the fourth weight.

2. The method of claim 1, further comprising:
    receiving a second weight contribution value associated with the driving shape; and
    deforming the vertices in the second region according to the second weight contribution value.

3. The method of claim 2, further comprising:
    identifying a plurality of vertices to form a third set of vertices that defines a third region of the 3-D model, the plurality of vertices for the third region including at least one vertex from the first set of vertices and at least one vertex from the second set of vertices, the third region being located between the first region and the second region; and
    deforming the vertices in the third region according to the first weight contribution value and the second weight contribution value.

4. The method of claim 3, further comprising:
    identifying the plurality of vertices to form the third set of vertices by applying a smoothing filter to the color channel values of the vertices in the 3-D model that impacts the deforming of the vertices.

5. The method of claim 2, wherein the first weight contribution value does not equal the second weight contribution value.

6. The method of claim 1, wherein the first region of the 3-D model is adjacent to the second region of the 3-D model to form a boundary separating the first region of the 3-D model and the second region of the 3-D model where the two regions meet on a surface of the 3-D model, and wherein at least part of the boundary between the first region of the 3-D model and the second region of the 3-D model is non-linear.

7. The method of claim 6, wherein the boundary follows a contour line on the 3-D model.

8. The method of claim 1, wherein partitioning the vertices in the 3-D model between a first set of vertices that defines a first region of the 3-D model and a second set of vertices that defines a second region of the 3-D model, further comprises:
    identifying vertices in the 3-D model to be included in the first set of vertices by multiplying the positional value of each vertex by the color channel value of the same vertex, and
    assigning all remaining vertices in the 3-D model to be included in the second set of vertices.

9. The method of claim 1, in which the color channel value for each vertex is between zero and one, inclusive.

10. The method of claim 1, wherein the color channel value is selected from the group consisting of a red color channel value, a green color channel value, a blue color channel value, and an alpha channel.

11. The method of claim 1, wherein the color channel value is selected from the group consisting of a cyan color channel value, a magenta color channel value, a yellow color channel value, and a black color channel value.

12. A computer-implemented method to determine a 3-D model, the 3-D model having a surface that includes a plurality of vertices, the method comprising:
    obtaining, using one or more computing devices, a color channel value for each vertex in the 3-D model;
    partitioning, using the one or more computing devices, the vertices in the 3-D model between a first set of vertices that defines a first region of the model that comprises a first set of a plurality of polygons and a second set of vertices that defines a second region of the model that comprises a second set of a plurality of polygons, wherein the partitioning occurs based on the color channel value for each vertex, wherein the first region and the second region are distinct non-overlapping regions each containing a plurality of non-overlapping polygons, and wherein none of the first set of a plurality of polygons in the first region of the 3-D model overlap with any of the second set of a plurality of polygons in the second region of the 3-D model;

receiving, using the one or more computing devices, a first weight contribution value associated with a driving shape;

deforming, using the one or more computing devices, the vertices in the first region according to the first weight contribution value;

obtaining, using the one or more computer devices, a second color channel value for each vertex in the 3-D model;

partitioning, using the one or more computing devices, the vertices in the 3-D model between a third set of vertices that defines a third region of the model and a fourth set of vertices that defines a fourth region of the model, wherein the partitioning occurs based on the second color channel value for each vertex;

receiving, using the one or more computing devices, a third weight contribution value and a fourth weight contribution value associated with a second driving shape;

deforming, using the one or more computing devices, the vertices in the third region of the model according to the third weight contribution value; and deforming, using the one or more computing devices, the vertices in the fourth region of the model according to the fourth weight contribution value.

13. The computer-implemented method of claim 12, further comprising:

receiving, using the one or more computing devices, a second weight contribution value associated with the driving shape; and deforming, using the one or more computing devices, the vertices in the second region of the model according to the second weight contribution value.

14. The computer-implemented method of claim 13, further comprising:

identifying, using the one or more computing devices, a plurality of vertices to form a third set of vertices that defines a third region of the 3-D model, the plurality of vertices for the third region including at least one vertex from the first set of vertices and at least one vertex from the second set of vertices, the third region of the 3-D model being located between the first region of the 3-D model and the second region of the 3-D model; and deforming, using the one or more computing devices, the vertices in the third region of the model according to the first weight contribution value and second weight contribution value.

15. The computer-implemented method of claim 14, further comprising:

identifying, using the one or more computing devices, the plurality of vertices to form the third set of vertices by applying a smoothing filter to the color channel values of the vertices in the 3-D model that impacts the deforming of the vertices.

16. The computer-implemented method of claim 13, wherein the first weight contribution value does not equal the second weight contribution value.

17. The computer-implemented method of claim 12, wherein the first region of the 3-D model is adjacent to the second region of the 3-D model to form a boundary separating the first region of the 3-D model and the second region of the 3-D model where the two regions meet on the surface of the 3-D model, and wherein at least part of the boundary between the first region of the 3-D model and the second region of the 3-D model is non-linear.

18. The computer-implemented method of claim 17, wherein the boundary follows a contour line on the 3-D model.

19. The computer-implemented method of claim 12, wherein partitioning the vertices in the 3-D model between a first set of vertices that defines a first region of the model and a second set of vertices that defines a second region of the model further comprises:

identifying, using the one or more computing devices, the vertices in the 3-D model to be included in the first set of vertices by multiplying the positional value of each vertex by the color channel value of the same vertex, and assigning, using the one or more computing devices, all remaining vertices in the 3-D model to be included in the second set of vertices.

20. The computer-implemented method of claim 12, wherein the color channel value for each vertex is either zero or one.

21. The computer-implemented method of claim 12, wherein the color channel value is selected from the group consisting of a red color channel value, a green color channel value, a blue color channel value, and an alpha channel.

22. The computer-implemented method of claim 12, wherein the color channel value is selected from the group consisting of a cyan color channel value, a magenta color channel value, a yellow color channel value, and a black color channel value.

23. A system to determine a 3-D model, the 3-D model having a surface that includes a plurality of vertices, the system comprising:

a memory device in communication with a processor, the memory device having instructions stored thereon that, in response to execution by the processor, cause the processor to:

obtain a color channel value for each vertex in the 3-D model;

partition the vertices in the 3-D model between a first set of vertices that defines a first region of the model that comprises a first set of a plurality of polygons and a second set of vertices that defines a second region of the model that comprises a second set of a plurality of polygons, wherein the partitioning occurs based on the color channel value for each vertex, wherein the first region and the second region are distinct non-overlapping regions each containing a plurality of non-overlapping polygons, and wherein none of the first set of a plurality of polygons in the first region of the 3-D model overlap with any of the second set of a plurality of polygons in the second region of the 3-D model;

receive a first weight contribution value associated with a driving shape;

deform the vertices in the first region according to the first weight contribution value;

obtain a second color channel value for each vertex in the 3-D model;

partition the vertices in the 3-D model between a third set of vertices that defines a third region of the model and a fourth set of vertices that defines a fourth region of the model, wherein the partitioning occurs based on the second color channel value for each vertex;

receive a third weight contribution value and a fourth weight contribution value associated with a second driving shape;

deform the vertices in the third region of the model according to the third weight contribution value; and deform the vertices in the fourth region of the model according to the fourth weight contribution value.

24. The system of claim 23, wherein the instructions stored on the memory device, in response to execution by the processor, further cause the processor to:
receive a second weight contribution value associated with the driving shape; and
deform the vertices in the second region of the model according to the second weight contribution value.

25. The system of claim 24, wherein the instructions stored on the memory device, in response to execution by the processor, further cause the processor to:
identify a plurality of vertices to form a third set of vertices that defines a third region of the 3-D model, the plurality of vertices for the third region including at least one vertex from the first set of vertices and at least one vertex from the second set of vertices, the third region of the 3-D model being located between the first region of the 3-D model and the second region of the 3-D model; and
deform the vertices in the third region of the model according to the first weight contribution value and second weight contribution value.

26. The system of claim 25, wherein the instructions stored on the memory device, in response to execution by the processor, further cause the processor to:
identify the plurality of vertices to form the third set of vertices by applying a smoothing filter to the color channel values of the vertices in the 3-D model that impacts the deforming of the vertices.

27. The system of claim 24, wherein the first weight contribution value does not equal the second weight contribution value.

28. The system of claim 23, wherein the first region of the 3-D model is adjacent to the second region of the 3-D model to form a boundary separating the first region of the 3-D model and the second region of the 3-D model where the two regions meet on a surface of the 3-D model, and wherein at least part of the boundary between the first region of the 3-D model and the second region of the 3-D model is non-linear.

29. The system of claim 28, wherein the boundary follows a contour line on the 3-D model.

30. The system of claim 23, wherein as the processor partitions the vertices in the 3-D model into a first set of vertices to define a first region of the model and a second set of vertices to define a second region of the model, the processor further:
identifies the vertices in the 3-D model to be included in the first set of vertices by multiplying the positional value of each vertex by the color channel value of the same vertex, and
assigns all remaining vertices in the 3-D model to be included in the second set of vertices.

31. The system of claim 23, wherein the color channel value for each vertex is between zero and one, inclusive.

32. The system of claim 23, wherein the color channel value is selected from the group consisting of a red color channel value, a green color channel value, a blue color channel value, and an alpha channel.

33. The system of claim 23, wherein the color channel value is selected from the group consisting of a cyan color channel value, a magenta color channel value, a yellow color channel value, and a black color channel value.

* * * * *